April 26, 1938.  F. GÖTZ  2,115,522

FRICTIONAL TRANSMISSION GEARING

Filed March 6, 1936   3 Sheets-Sheet 1

FRANTIŠEK GÖTZ
INVENTOR

BY
his ATTORNEY.

April 26, 1938.　　　　F. GÖTZ　　　　2,115,522
FRICTIONAL TRANSMISSION GEARING
Filed March 6, 1936　　　3 Sheets-Sheet 3
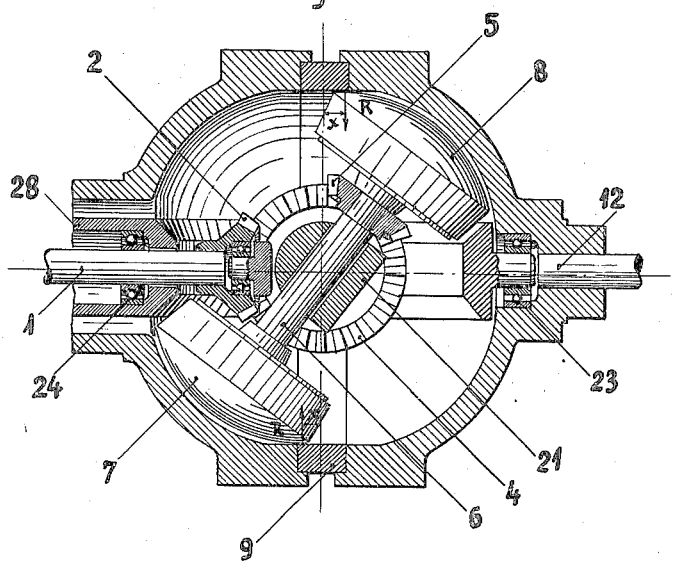
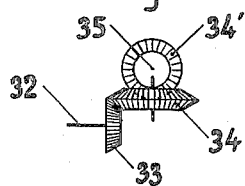
FRANTIŠEK GÖTZ
INVENTOR
By Otto Munk
his ATT'Y.

Patented Apr. 26, 1938

2,115,522

UNITED STATES PATENT OFFICE 2,115,522

FRICTIONAL TRANSMISSION GEARING

František Götz, Prague-Smichov, Czechoslovakia, assignor to Limited Company formerly the Skoda Works, Plzen, Prague, Czechoslovakia, a corporation of Czechoslovakia Application March 6, 1936, Serial No. 67,454
In Czechoslovakia March 21, 1935

5 Claims. (Cl. 74—198)

This invention relates to frictional transmission gearing.

Types of frictional transmission gearing are already known in which the one part consists of two dome-headed friction members disposed at the ends of a shaft, this part being as a unit pivotally mounted inside a bell which constitutes the second part of the gearing, and with the inner friction surface of which the dome-headed friction members of the first part co-act. In the known types of such gearing the friction bell is overhung, and this arrangement, while simplifying the driving and tilting of the inner part of the gearing (since these operations can be easily performed from the open side of the friction bell), gives rise to various drawbacks such as, more particularly, vibration of the bell which in its turn impairs the efficiency of the transmission.

The present invention has for its object to provide frictional transmission gearing in which the above-mentioned drawbacks are obviated, and which, in consequence of its high transmitting efficiency, can be used for a great variety of purposes, and more particularly in cases involving shocks and vibration, as for instance in power-driven vehicles. In accordance with the invention this result is achieved by making the outer part in the form of a drum mounted in bearings on either side, and making the means for tilting the inner part operable through one of these bearings.

Forms of construction of frictional transmission gearing embodying the principle of the present invention are shown by way of example in the accompanying drawings, in which:

Figs. 4–6 show a modified form of construction of the frictional gearing suitable more particularly for use in power-driven vehicles, Fig. 4 being a transverse section, Fig. 5 a vertical longitudinal section, and Fig. 6 a horizontal longitudinal section.

Fig. 7 shows diagrammatically a further modification.

Figure 1:
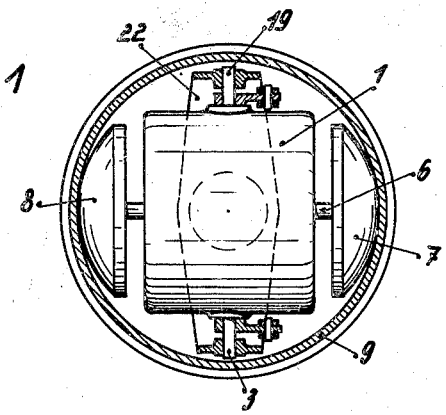
Fig. 1 shows diagrammatically one form of construction of the frictional transmission gearing according to the invention, in transverse section.
Figure 2:
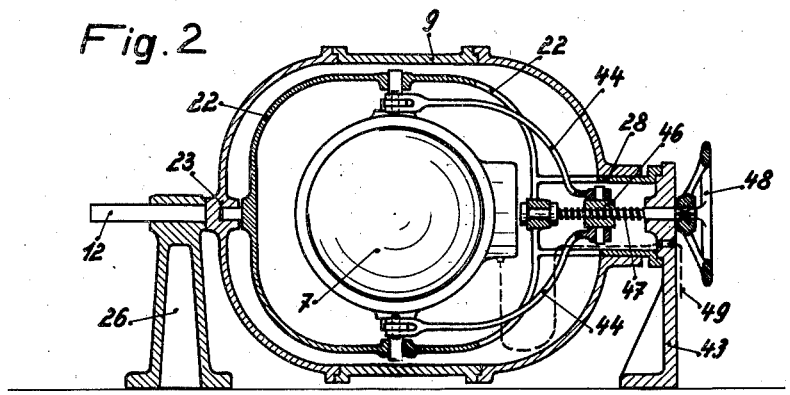
Fig. 2 shows the gearing in vertical longitudinal section.
Figure 3:
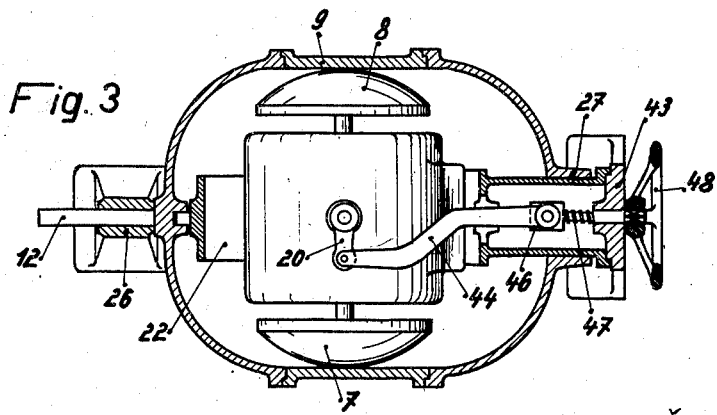
Fig. 3 shows the same in horizontal longitudinal section.

In the constructional example shown in Figs. 1–3, I denotes the prime mover, for example an electromotor, which is provided at both ends of its shaft 6 with dome-headed friction bodies 7 and 8 which may be moved outwards in opposite directions in any one of a large number of suitable ways, for example by means of screw threads, and thereby pressed against the inner surface of a friction drum 9. This drum is mounted on opposite sides in bearings 26 and 27 (Fig. 3). The motor I is pivotally mounted by means of pins or journals 3, 19 in a hoop 22 (Fig. 2) which is centered at one side in a bearing 23 and provided on the other side with a boss 28 extending out through the wall of the drum and secured to the supporting upright 43.

The tilting of the motor for the purpose of varying the transmission ratio can be effected in a variety of ways. In the constructional example shown this purpose is served by a linking rod 44 which is articulated at one end to the lever 20 and at the other end to a pin pertaining to a nut 46. In the present example this arrangement is duplicated, as shown in Fig. 2. The tilting of the motor I is then effected by means of a spindle 47 which is screw threaded for engagement by the nut 46, and adapted to be rotated by a hand-wheel 48. The nut 46 moves within the boss 28 pertaining to the stationary hoop 22. This hoop is provided with an aperture for the passage of the current leads 49 which are taken to the terminals of the motor I.

The mode of operation of the frictional transmission gearing is as follows:

When the running motor I is in the mid-way position, as indicated in Fig. 3, the drum 9 and the driven shaft 12 are at rest. When the motor is tilted from the zero position (Fig. 3) to one side the drum 9, and with it the driven shaft 12, becomes rotated in one direction. On the tilting of the motor from the neutral position (Fig. 3) to the other side the drum 9 and the driven shaft 12 are rotated in the opposite direction. The speed of rotation of the drum 9 and of the driven shaft 12 is dependent on the extent to which the motor I is tilted, that is to say the angle through which the lever 20 is moved.

The principle of the invention remains unaltered if only one of the two dome-headed friction members 7, 8 is movable while the other is fixed on the shaft 6. In this case also the mutual engagement of the two dome-headed members with the inner friction surface of the drum 9 is ensured.

The shaft 6 need not be directly driven by a motor, but can equally well be rotated from an outside source of power. A constructional example in which this is the case is shown in Figs. 4–6.

To the main shaft 1 (Figs. 5 and 6) of the one part of the gearing there is keyed a bevel gear 2 which meshes with the bevel gear 4 which is loosely rotatable on the journal 3. With the bevel gear 4 there meshes the bevel gear 5 which is fast on the shaft 6 carrying on its two ends the dome-headed friction members 7 and 8. These two dome-headed friction members 7 and 8 are axially movable in opposite directions, which can be provided for in a variety of ways, and thereby pressed against the inner surface of a friction ring 9 which, together with the shields 10 and 11 constitutes a drum which is firmly connected to the shaft 12. The parts 9, 10, 11, and 12 constitute the second part of the gearing and in the present instance the driven part.

Figure 4:
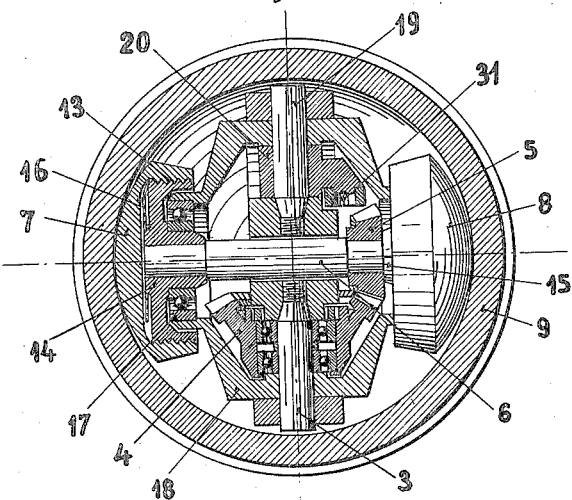
Figure 5:
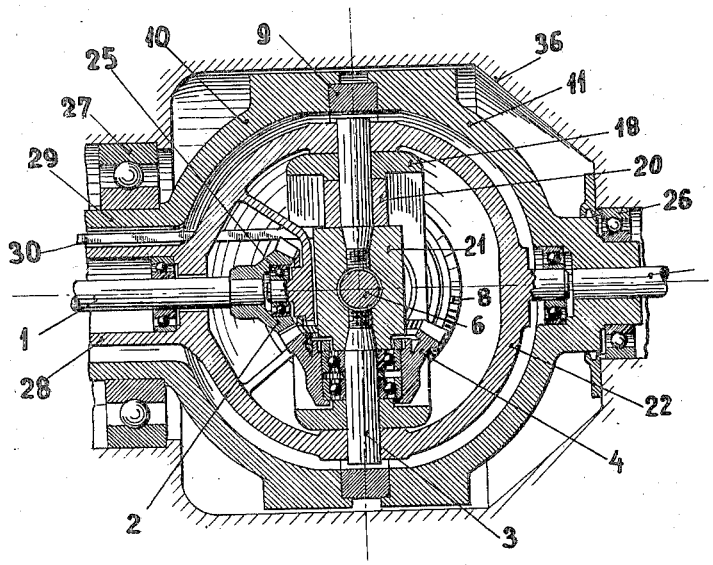

In Fig. 4 the means for pressing the dome-headed friction members 7, 8 against the friction ring 9 are indicated as being screw threads 13 of suitable pitch. The threading on one of the dome-headed members is left-handed and that on the other right-handed, so that when the shaft 6 is rotated in a certain direction the two dome-headed friction members travel on the screw threading in an outward direction. Each of the two dome-headed friction members 7 and 8 is supported and guided by the respective threaded hubs 14 and 15. In order to ensure contact between the friction surfaces, the dome-headed members 7 and 8 are gently pressed against the friction ring 9 by means of weak springs 16, as indicated in Fig. 4 in connection with the member 7.

The shaft 6, carrying the dome-headed friction members 7 and 8, is mounted in bearings 17; these latter are supported in an auxiliary casing 18 which is firmly attached to the journals 3 and 19. To the journal 19 there is attached a lever 20. 21 denotes a central block which is traversed by the shaft 6, and in which the inner ends of the journals 3 and 19 are secured. The shaft 6, together with the dome-headed friction members 7 and 8, the members 18 and 21, the journals 3 and 19, the lever 20, and the bevel gears 4 and 5 constitute an assembly which is pivotally mounted about the journals 3 and 19 in the hoop 22. The hoop 22 is mounted in bearings 23 and 24. On the hoop 22 there is provided the bearing 25 which supports the driving shaft 1. All the described component parts are assembled in the drum formed of the friction ring 9 and shields 10 and 11. This drum is mounted in the bearings 26 and 27 which are directly supported in a housing 36 enclosing the entire transmission gearing.

Through the gap between the boss 28 on the hoop 22 and the hub 29 of the drum there is passed a tension rod 30 which is articulated with its inner end to a pin 31 on the tilting lever 20. The other end of the rod 30 is extended, by means of levers, rods, or other suitable members, to a point from which it is convenient to operate the tilting means. It will be clear that the tilting of the shaft 6 carrying the dome-headed friction members 7 and 8 can also be effected by any other suitable means.

The friction ring 9 and the dome-headed friction members 7 and 8 are made from hardened steel and ground to the required surface and finish. The friction surfaces are also lubricated with oil with which the drum is filled.

The mode of operation of the frictional transmission gearing shown in Figs. 4–6 is as follows:

The movement of the driving shaft 1 is transmitted from the bevel gear 2 to the bevel gear 4 which, through the intermediary of the bevel gear 5, drives the shaft 6 carrying the dome-headed friction members 7 and 8. By virtue of the left-handed threading on the one dome-headed friction member and of the right-handed threading on the second dome-headed friction member, these two friction members 7 and 8 are pressed against the friction ring 9 with a force corresponding to the torque to be transmitted. At the same time the speed of rotation of the drum and of the driven shaft 12 is dependent on the position to which the shaft 6 is tilted at the time.

In Fig. 6 there is indicated one extreme position of the shaft 6, corresponding to maximum speed of the driven shaft 12 in one direction. If with the aid of the rod 30 the shaft 6 be so tilted that the angle between the shaft 6 and the axis of the shaft 12 becomes larger the effective diameters at the dome-headed friction members 7 and 8 become smaller, and consequently the speed of rotation of the driven shaft 12 falls. When the shaft 6 is at an angle of 90° to the axes of the shafts 1 and 12 the effective diameter of the dome-headed friction members 7 and 8 becomes nil, and the driven shaft 12 is consequently at a standstill. In this neutral position there is only slight pressure between the friction surfaces, since the intermediate point contact sets up merely a slight moment by which the dome-headed members 7 and 8 mounted on the screw threads 13 are lightly pressed against the friction ring 9.

On further movement of the rod 30 the neutral position is passed over and the drum and the driven shaft 12 become rotated in the reverse direction. The speed of vehicles when reversing is as a rule required to be but slight. When the gearing is intended for use in power-driven vehicles, therefore, in order to achieve this result with a small diameter of the drum 9, 10, 11 the bevel gear 5 is attached to the shaft 6 on that side which approaches the gear wheel 2 when changing gear to reverse. The maximum angle of the shaft 6, and hence the maximum reverse speed is determined by the fact that the bevel wheel 5 has not yet come in contact with the bevel wheel 2. For forward movement, on the other hand, the shaft 6 can be tilted through a larger angle, so that higher speed can be obtained. The maximum deflection in this direction is determined by the fact that the shaft 6 has not yet come up against the bevel wheel 2 (cf. position of shaft 6 in Fig. 6).

If it is desired that the maximum forward speed be equal to the maximum reverse speed, this result can be achieved either by increasing the diameter of the gear wheel 4 or by the interposition of gearing. The latter case is shown diagrammatically in Fig. 7. The driving shaft 32 is provided with a gear wheel 33 which drives a double bevel wheel 36; on the one side of the bevel wheel 36 there meshes the wheel 33 and on the other side the wheel 34. The bevel wheel 34 is attached to the shaft 35 which carries at its ends the dome-headed friction members. In this case the shaft 35 is afforded the possibility of being tilted to an equal extent in both directions.

The advantages of frictional transmission gearing of the type comprising dome-headed friction members which are disposed at the ends of a tiltable shaft and adapted to co-act with the inside surface of a friction drum consist in the fact that the very considerable forces set up in the gearing can be partly and if desired entirely compensated. Since the curvature of the operative end surface of the dome-headed friction members 7 and 8 is of a diameter smaller than the diameter of the drum there becomes set up at the points of contact between the friction surfaces a moment produced by the action of the reaction R at the arms $x$. It is therefore merely necessary to take up this moment by means of rotary mechanism. With the described construction of the frictional transmission gearing it is possible to diminish this moment or even, if desired, to eliminate it altogether. This result is achieved by mounting the freely rotating bevel wheel 4, according to the direction of rotation of the driving shaft 1, either below as shown in Figs. 4–6, or above, and thereby setting up by the bevel wheel 5 (Figs. 4–6) or by the bevel wheel 34 (Fig. 7) a moment which partly or entirely cancels the moment $R.x$ by striving to tilt the axis 6 in the rotation direction.

It will be obvious that the functions of the driving and of the driven shaft can be exchanged without affecting the essence of the presence invention.

I claim:

1. Frictional transmission gearing comprising in combination an outer supporting structure, bearings in the said structure, a hollow member constituting the one part of the said gearing and mounted at opposite sides in the said bearings, an inner supporting structure having a boss extending through one of the said bearings and secured in the said outer supporting structure, a friction surface on the inside of the wall of said hollow member, a main shaft supported in said boss, a tilting shaft pivotally mounted in said inner supporting structure, swivel gearing between said main shaft and tilting shaft, a dome-headed friction member on each end of the said tilting shaft and adapted to co-act with the said friction surface, at least one of the said dome-headed friction members being longitudinally displaceable on the said tilting shaft, means for pressing at least one of the said dome-headed friction members against the said friction surface in dependence on the rotation of the said tilting shaft, the said main shaft, swivel gearing, tilting shaft, and friction members constituting the other part of the transmission gearing, means for tilting the said tilting shaft to vary the transmission ratio of the gearing, and a prime mover coupled to one of the said parts, the said tilting means extending through a gap between said boss and bearing.

2. Frictional transmission gearing as claimed in claim 1 in which the said swivel gearing comprises a bevel gear keyed to the said main shaft, a bevel gear keyed to the said tilting shaft, and an intermeshing bevel gear loosely rotatable about the pivot axis of the said tilting shaft, in the said inner supporting structure.

3. Frictional transmission gearing as claimed in claim 1 in which the said hollow member consists of two end-shields and an intervening friction ring.

4. Frictional transmission gearing comprising in combination a supporting structure, bearings therein, a hollow member constituting one part of said gearing and being supported at opposite sides by the said bearings, said hollow member having an inside friction surface, a rotary shaft arranged within said hollow member, a dome-headed friction member on each end of the said shaft to coact with the said friction surface, said shaft and friction members constituting the other part of the gearing, a stationary hoop pivotally supporting said shaft about an axis perpendicular to the axis of the hollow member and the longitudinal axis of the shaft, said hoop being disposed within said hollow member clear of the range of movement of the said shaft and dome-headed friction members, a boss projecting from one side of said hoop through one of said bearings and secured to the said supporting structure, a further bearing carried by the wall of the hollow member and supporting said hoop opposite said boss, means for tilting said shaft to vary the transmission ratio of the gearing, said tilting means extending through one of the said bearings so as to be operable from the outside, and a prime mover coupled to one of the said parts of the gearing.

5. Frictional transmission gearing, as claimed in claim 1, in which the tilting means comprises a tilting lever associated with the said shaft and at least one tension rod articulated to the said lever and projecting through one of said bearings.

FRANTIŠEK GÖTZ.